United States Patent
Yano et al.

(10) Patent No.: US 10,263,501 B2
(45) Date of Patent: Apr. 16, 2019

(54) VIBRATION GENERATOR AND ELECTRONIC DEVICE HAVING THE SAME

(71) Applicant: HOSIDEN CORPORATION, Yao-shi (JP)

(72) Inventors: Yushi Yano, Kashiwara (JP); Hideyuki Kataoka, Kashiwara (JP); Masayuki Ikehara, Yao (JP)

(73) Assignee: HOSIDEN CORPORATION, Yao-shi (JP)

( * ) Notice: Subject to any disclaimer, the term of this patent is extended or adjusted under 35 U.S.C. 154(b) by 261 days.

(21) Appl. No.: 15/232,247

(22) Filed: Aug. 9, 2016

(65) Prior Publication Data

US 2017/0063212 A1 Mar. 2, 2017

(30) Foreign Application Priority Data

Aug. 27, 2015 (JP) .................................. 2015-167623

(51) Int. Cl.
*H02K 33/02* (2006.01)
*H02K 1/34* (2006.01)
(Continued)

(52) U.S. Cl.
CPC ............. *H02K 33/02* (2013.01); *B06B 1/045* (2013.01); *H02K 1/34* (2013.01); *H02K 33/04* (2013.01);
(Continued)

(58) Field of Classification Search
CPC ... B06B 1/04; H02K 1/12; H02K 1/34; H02K 2203/12; H02K 33/02; H02K 33/04; H02K 5/04
(Continued)

(56) References Cited

U.S. PATENT DOCUMENTS

| 2,149,126 A | 2/1939 | Spencer |
| 6,867,513 B1 * | 3/2005 | Werson ................... H02K 1/30 29/598 |

(Continued)

FOREIGN PATENT DOCUMENTS

| EP | 1914761 A1 | 4/2008 |
| GB | 501957 A | 3/1939 |

(Continued)

OTHER PUBLICATIONS

European Patent Application No. 16020298.2: Extended European Search Report dated Jan. 23, 2017.

*Primary Examiner* — Alex W Mok
(74) *Attorney, Agent, or Firm* — Kratz, Quintos & Hanson, LLP

(57) ABSTRACT

A vibration generator including a coil, a plunger including a first shaft and a second shaft, and a frame. The first shaft is received in the coil such as to be movable in a first direction. The second shaft extends in a second direction orthogonal to the first direction, is disposed on the other side in the first direction relative to the coil with a gap therebetween. The first and second shafts are partly made of a magnetic material so as to be magnetically attractable to the coil and thereby movable to one side in the first direction. The frame is fixed to the first and second shafts at positions on the one and other sides, respectively, in the first direction relative to the coil, and elastically deformable at least partly as a result of movement of the first and second shafts.

21 Claims, 13 Drawing Sheets

(51) Int. Cl.
  *H02K 33/04* (2006.01)
  *B06B 1/04* (2006.01)
  *H02K 1/12* (2006.01)
  *H02K 5/04* (2006.01)

(52) U.S. Cl.
  CPC ............... *H02K 1/12* (2013.01); *H02K 5/04* (2013.01); *H02K 2203/12* (2013.01)

(58) Field of Classification Search
  USPC .......................................................... 310/24
  See application file for complete search history.

(56) References Cited

U.S. PATENT DOCUMENTS

| | | |
|---|---|---|
| 2007/0236089 A1 | 10/2007 | Okubo |
| 2010/0013614 A1 | 1/2010 | Sproelich et al. |
| 2015/0137628 A1 | 5/2015 | Endo et al. |

FOREIGN PATENT DOCUMENTS

| | | | | |
|---|---|---|---|---|
| GB | 797649 A | | 7/1958 | |
| GB | 2506922 A | * | 4/2014 | ............... H02K 1/28 |
| JP | 2001/178104 A | | 6/2001 | |
| JP | 2001/218440 A | | 8/2001 | |
| JP | 2010-27613 A1 | | 2/2010 | |

* cited by examiner

VIBRATION GENERATOR AND ELECTRONIC DEVICE HAVING THE SAME

CROSS-REFERENCE TO RELATED APPLICATIONS

The present application claims priority under 35 U.S.C. § 119 of Japanese Patent Application No. 2015-167623 filed on Aug. 27, 2015, the disclosure of which is expressly incorporated by reference herein in its entity.

BACKGROUND OF THE INVENTION

Technical Field

The invention relates to vibration generators for generating vibrations and to electronic devices having the vibration generators.

Background Art

Japanese Unexamined Patent Publication No. 2010-27613 discloses a conventional vibration generator including a plastic frame, a coil, a stationary pole, and a movable pole. The plastic frame of ring shape has a central open part, which houses the coil, the stationary pole, and the movable pole. The stationary pole is a generally L-shaped magnetic member having a long leg and a short leg. The long leg of the stationary pole is received in the coil and has first and second lengthwise ends fixed to the plastic frame. The short leg of the stationary pole extends perpendicularly from the first lengthwise end of the long leg of the stationary pole. The movable pole is a generally L-shaped magnetic member (plunger) having a long leg and a short leg. The long leg of the movable pole extends in parallel with the long leg of the stationary pole and has first and second lengthwise ends fixed to the plastic frame. The first lengthwise end of the long leg of the movable pole is opposed to the short leg of the stationary pole with a gap therebetween. The short leg of the movable pole extends perpendicularly from the second lengthwise end of the long leg of the movable pole and is opposed the second end of the long leg of the stationary pole with a gap therebetween.

When the coil is energized with electric current, the movable pole is magnetically attracted toward the stationary pole to elastically deform the plastic frame. When the coil is de-energized, the coil stops magnetically attracting the movable pole to allow restoration of the plastic frame. When the coil continues to be alternately energized and de-energized, the plastic frame is elastically deformed and restored alternately to generate vibrations.

SUMMARY OF INVENTION

In the above conventional vibration generator, the movable pole is disposed away from the coil and the stationary pole. Therefore, there is a high magnetic resistance, resulting in decreased magnetic attraction force of the coil applied to the movable pole.

In view of the above circumstances, the invention has been conceived to provide a vibration generator with enhanced magnetic attraction force of a coil applied to a plunger. The invention also provides an electronic device having the vibration generator.

A vibration generator according to an aspect of the invention includes a coil, a plunger, and a frame. The plunger includes a first shaft and a second shaft. The first shaft is received in the coil such as to be movable in a first direction and at least partly made of a magnetic material so as to be magnetically attractable to the coil and thereby movable to one side in the first direction. The second shaft extends in a second direction orthogonal to the first direction, is disposed on the other side in the first direction relative to the coil with a gap therebetween, and is at least partly made of a magnetic material so as to be magnetically attractable to the coil and thereby movable to the one side in the first direction. The frame is fixed to the first shaft at a position on the one side in the first direction relative to the coil, fixed to the second shaft at a position on the other side in the first direction relative to the coil, and elastically deformable at least partly as a result of movement of the first and second shafts.

When the coil is energized, the first and second shafts of the plunger are magnetically attracted toward the coil to move to the one side in the first direction, and the frame is elastically deformed at least partly. When the coil is de-energized, the coil stops magnetically attracting the first and second shafts of the plunger, the frame is restored (returns to its original size and shape), and the first and second shafts of the plunger move back to their initial positions. Repeated elastic deformation and restoration of the frame generate vibrations. It should be noted that the second shaft as well as the first shaft of the plunger is magnetically attracted toward the coil. Moreover, the first shaft of the plunger is received in the coil to decrease magnetic resistance. This enhances magnetic attraction force of the coil applied to the plunger.

The first shaft of the plunger may include a first portion of a magnetic material and a second portion of a nonmagnetic material. The first portion may be received in the coil. The second portion may extend from the first portion to the one side in the first direction to be located outside the coil.

The first shaft of the plunger may alternatively include a third portion of a magnetic material and a fourth portion of a nonmagnetic material. The third portion may be received in the coil. The fourth portion may include a body and an extension. The body may be fixed to the third portion and located inside the coil. The extension may extend from the body to the one side in the first direction to be located outside the coil.

The vibration generator may further include at least one first yoke between the second shaft of the plunger and the coil. The second shaft may be disposed with a gap between the second shaft and the at least one first yoke. The vibration generator of this aspect achieves enhanced magnetic attraction force of the coil applied to the second shaft.

The vibration generator of any aspect above may further include at least one second yoke. The at least one second yoke may be disposed on the one side in the first direction relative to the coil. The vibration generator of this aspect achieves enhanced magnetic attraction force of the coil applied to the plunger.

The at least one second yoke may be disposed on the one side in the first direction relative to the coil, with a gap between itself and the coil and between itself and the first portion of the plunger. Alternatively, the at least one second yoke may be disposed on the one side in the first direction relative to the coil, with a gap between itself and the coil and between itself and the third portion of the plunger. The vibration generator of either aspect achieves enhanced magnetic attraction force of the coil applied to the first shaft.

The vibration generator of any aspect above may further include a third yoke and a fourth yoke. The third yoke may be disposed on one side in the second direction relative to the coil and extend in the first direction. The fourth yoke may be disposed on the other side in the second direction relative to the coil and extend in the first direction. The vibration generator of this aspect achieves enhanced magnetic attraction force of the coil applied to the plunger.

The first yoke may couple between the third yoke and the fourth yoke at a position on the other side in the first direction relative to the coil. Additionally or alternatively, the second yoke may couple couples the third yoke and the fourth yoke at a position on the one side in the first direction relative to the coil.

The vibration generator of any aspect above may further include a bobbin having a tuboid shape and an insulation property, with the coil wound therearound. The first shaft of the plunger may be received in the coil and the bobbin.

The bobbin may include a trunk with the coil wound therearound, and a first insulator. The first shaft of the plunger may be received in the coil and the trunk of the bobbin. The first insulator may be disposed between the first yoke and the coil.

Alternatively, the bobbin may include a trunk with the coil wound therearound, and a second insulator. The second insulator may be disposed between the second yoke and the coil.

The vibration generator of any aspect above may further include a buffer. The buffer may be held by and between the first yoke and the first insulator and/or held by and between the second yoke and the second insulator. In the vibration generator of this aspect, the buffer serves to suppress noises that may be generated by physical contacts between the first yoke and the first insulator and/or between the second yoke and the second insulator.

The first, third, and fourth yokes coupled together may hold the bobbin. At least one of the first, third, or fourth yokes may be fixed to the frame. In the vibration generator of this aspect, the first, third, and fourth yokes, the bobbin, and the coil are combined in a single unit, which can be readily fixed to the frame.

The second, third, and fourth yokes coupled together may hold the bobbin. At least one of the second, third, or fourth yokes may be fixed to the frame. In the vibration generator of this aspect, the second, third, and fourth yokes, the bobbin, and the coil are combined in a single unit, which can be readily fixed to the frame.

The first, second, third, and fourth yokes coupled together may hold the bobbin. At least one of the first, second, third, or fourth yokes may be fixed to the frame. In the vibration generator of this aspect, the first, second, third, and fourth yokes, the bobbin, and the coil are combined in a single unit, which can be readily fixed to the frame.

The frame may include a first fixable portion and a second fixable portion. The first fixable portion may be fixed to the first shaft at a position on the one side in the first direction relative to the coil. The second fixable portion may be fixed to the second shaft at a position on the other side in the first direction relative to the coil.

The first fixable portion may be fixed to the first shaft at a first position. The second fixable portion may be fixed to the second shaft at a second position. The first position may be at a first height position and on the one side in the first direction relative to the coil. The second position may be at a second height position and on the other side in the first direction relative to the coil. The first and second height positions may be different in height in a third direction. The third direction may preferably cross the first and second directions. In the vibration generator of this aspect, the first and second fixable portions are located at different height positions, making it easier for the frame to elastically deform at least partly.

The vibration generator of any aspect above may further include at least one pin or screw and at least one washer. The pin or screw may include a head. The pin or screw may be configured to fix the first fixable portion to the first shaft, and/or fix the second fixable portion to the second shaft. The washer may be held by and between the head of the pin or screw and the first fixable portion, and/or by and between the head of the pin or screw and the second fixable portion. The washer may include a tooth configured to dig into at least one of the first fixable portion and the second fixable portion. In the vibration generator of this aspect, the washer help prevent unintended disengagement of the first fixable portion from the first shaft and/or of the second fixable portion from the second shaft.

An electronic device according to an aspect of the invention includes the vibration generator of any aspect above, a fixable portion, and a vibratable member. The fixable portion may be fixed to the frame of the vibration generator. The vibratable member may be connected to the frame of the vibration generator and configured to be vibrated as a result of repeated elastic deformation and restoration of the frame.

The frame of the vibration generator may further include at least one third fixable portion and at least one fourth fixable portion. The third fixable portion may be fixed to the fixable portion of the electronic device. The fourth fixable portion may be fixed to the vibratable member. A pair of the fourth fixable portions may be provided. In this case, one of the fourth fixable portions may be fixed to the vibratable member at a position on the one side in the first direction of the third fixable portion, while the other fourth fixable portion may be fixed to the vibratable member at a position on the other side in the first direction of the third fixable portion. In the electronic device of any aspect in this paragraph, vibrations generated at the frame are more likely to travel to the vibratable member and less likely to travel to the fixable portions of the electronic device.

DESCRIPTION OF EMBODIMENTS

Figure 1A:
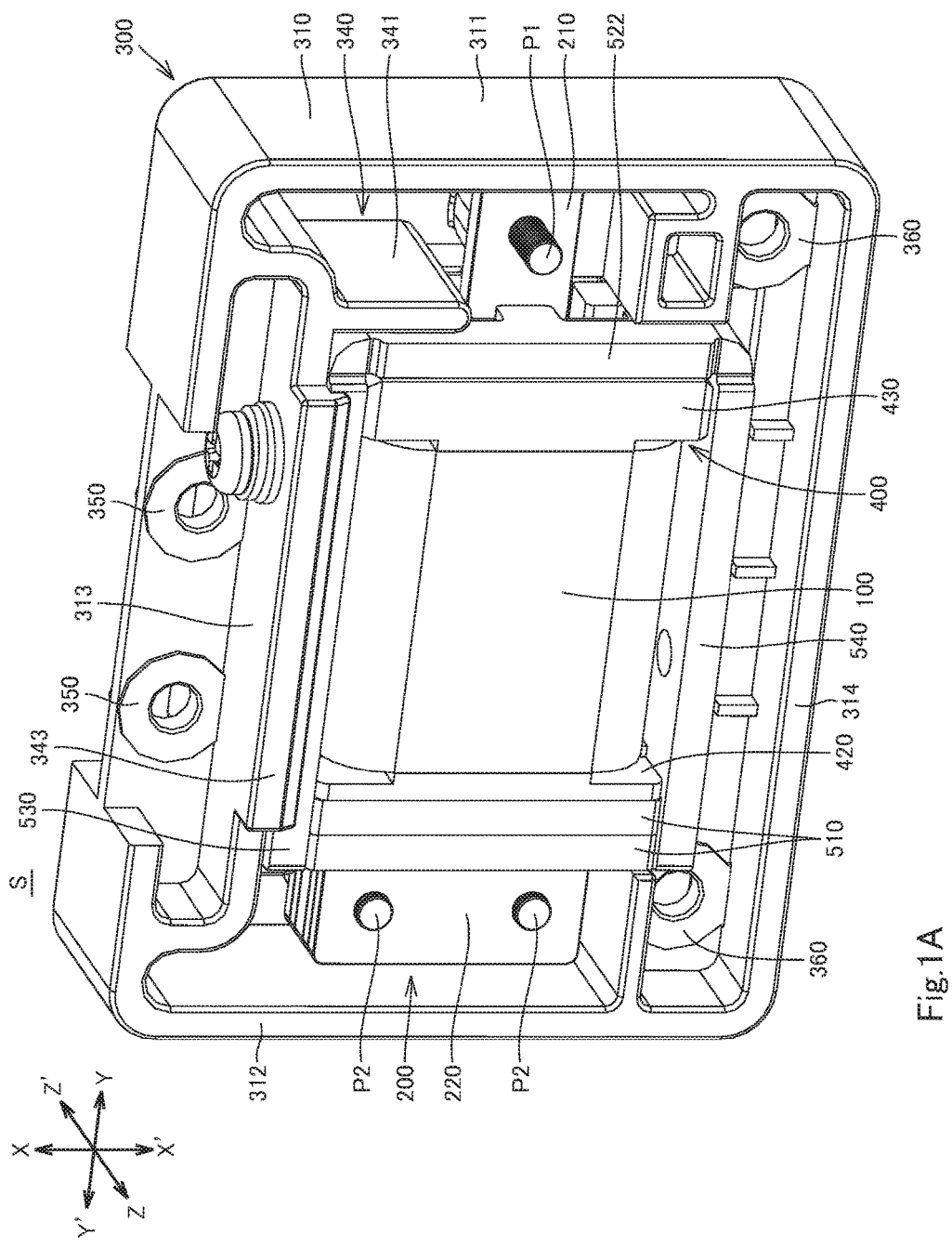
FIG. 1A is a front, top, right perspective view of a vibration generator according to an embodiment of the invention.
Figure 1B:
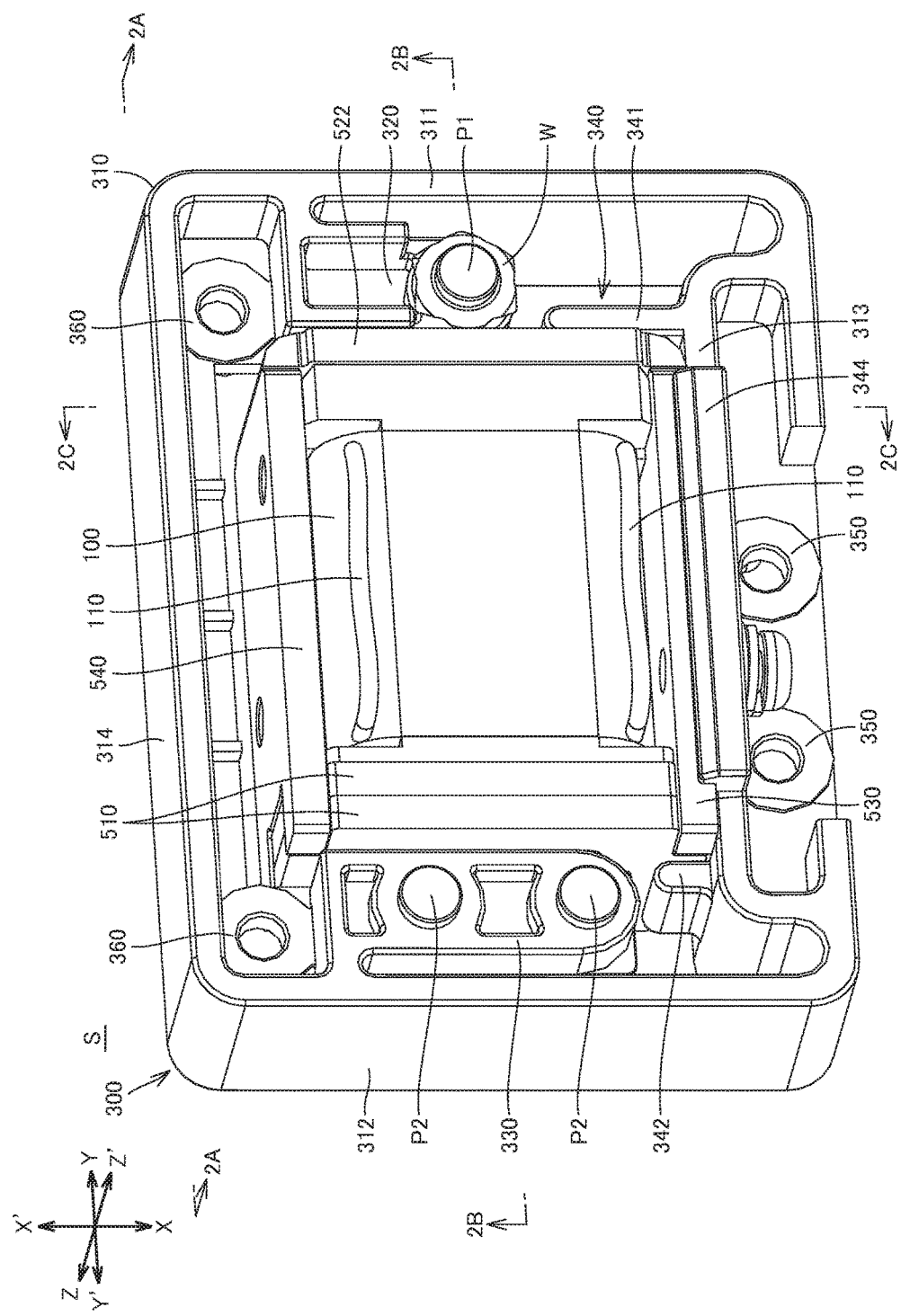
FIG. 1B is a rear, bottom, left perspective view of the vibration generator.

A vibration generator S according to an embodiment of the invention will now be described below with reference to FIGS. 1A to 3B. The vibration generator S includes a coil 100, a plunger 200, and a frame 300. The Y-Y' direction indicated in FIGS. 1A to 2B and 2D to 3B corresponds to the first direction recited in the claims. In the Y-Y' direction, the Y-direction corresponds to one side in the first direction, and the Y'-direction corresponds to the other side in the first direction. The X-X' direction indicated in FIGS. 1A to 2A and 2C to 3B corresponds to the second direction recited in the claims. The X-X' direction is orthogonal to the Y-Y' direction. The Z-Z' direction indicated in FIGS. 1A, 1B, and 2B to 3B corresponds to the third direction recited in the claims. The Z-Z' direction is orthogonal to the Y-Y' and X-X' directions.

The coil 100 extends in the Y-Y' direction and is of a tuboid shape with a circular or polygonal section (generally rectangular section in FIGS. 1A to 3B). The coil 100 is connected to and energized via a cable 110, a terminal (not shown), or a connector (not shown).

The plunger 200 includes a first shaft 210, which extends in the Y-Y' direction and is received in the coil 100 such as to be movable in the Y-Y' direction. The first shaft 210 may preferably be at least partly made of a magnetic material so as to be magnetically attractable to the coil 100 and thereby movable in the Y-direction from its initial position. The first shaft 210 may be in a shape of a circular cylinder, a polygonal prism, or the like extending in the Y-Y' direction. The initial position of the first shaft 210 of the plunger 200 is the position at which the first shaft 210 is located before elastic deformation of the frame 300.

The first shaft 210 may include a first portion 211 and a second portion 212. The first portion 211 is made of at least one member of a magnetic material and received in the coil 100 such as to be movable in the Y-Y' direction. The first portion 211 has a Y-direction end and a Y'-direction end. The second portion 212 is made of a nonmagnetic material and extends in the Y-direction from Y-direction end of the first portion 211 to be located outside the coil 100.

In the embodiment shown in FIGS. 2A to 2C, 3A, and 3B, the first shaft 210 is configured as follows. The first portion 211 of the first shaft 210 includes a plurality of magnetic plates 211a to 211e and a plurality of pins 211f. The plates 211a to 211e are stacked in this order in the Z-Z' direction and fixed together with the pins 211f. The second portion 212 of the first shaft 210 includes a body 212a and an engagement projection 212b. The engagement projection 212b is contiguous with the Y'-direction end of the body 212a. The engagement projection 212b is engaged with an engagement hole 211c1 of the plate 211c of the first portion 211 and held by and between the plates 211a and 211b and the plates 211d and 211e. The plates 211a and 211b are located on the Z-direction side relative to the plate 211c, and the plates 211d and 211e are located on the Z'-direction side relative to the plate 211c. The body 212a extends in the Y-direction from the Y-direction end of the first portion 211 to be located outside the coil 100.

The first portion 211 of any aspect above may include only the plate 211c, or alternatively include the plate 211c and at least one magnetic plate fixed to the plate 211c. The plates of the first portion 211 of any aspect above may be fixed together with at least one pin 211f or other known fixing means, such as, at least one pin other than the pins 211f, at least one screw, an adhesive, and at least one adhesive tape.

The first shaft 210 may include a third portion 213 and a fourth portion 214, in place of the first portion 211 and the second portion 212. The third portion 213 may preferably be made of at least one member of a magnetic material and received in the coil 100 such as to be movable in the Y-Y' direction. The fourth portion 214 is made of a nonmagnetic material. The fourth portion 214 includes a body 214a and an extension 214b. The body 214a is fixed to the third portion 213. The extension 214b extends in the Y-direction from the body 214a to be located outside the coil 100.

Figure 2A:
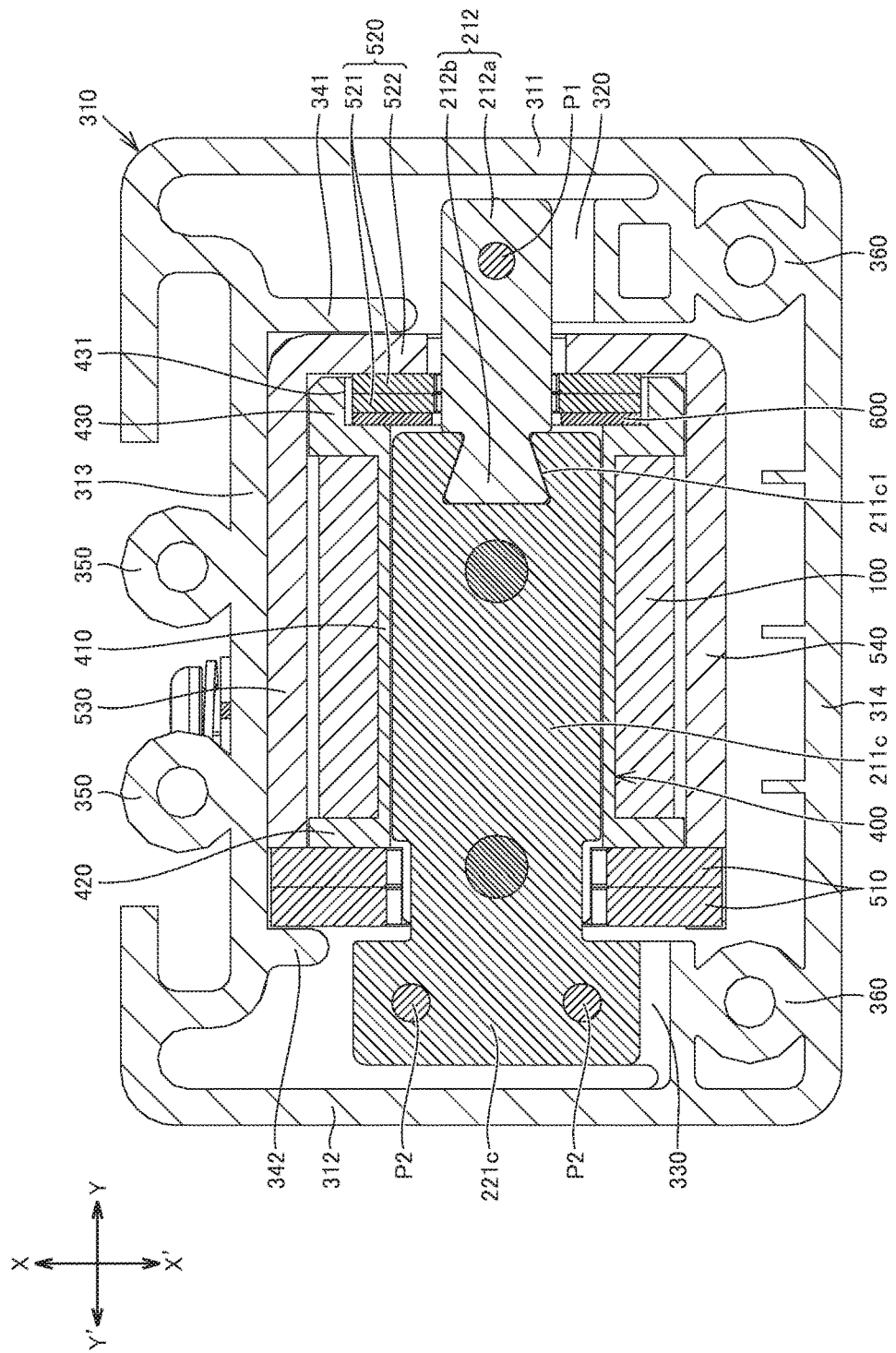
FIG. 2A is a sectional view of the vibration generator, taken along line 2A-2A in FIG. 1B.
Figure 2B:
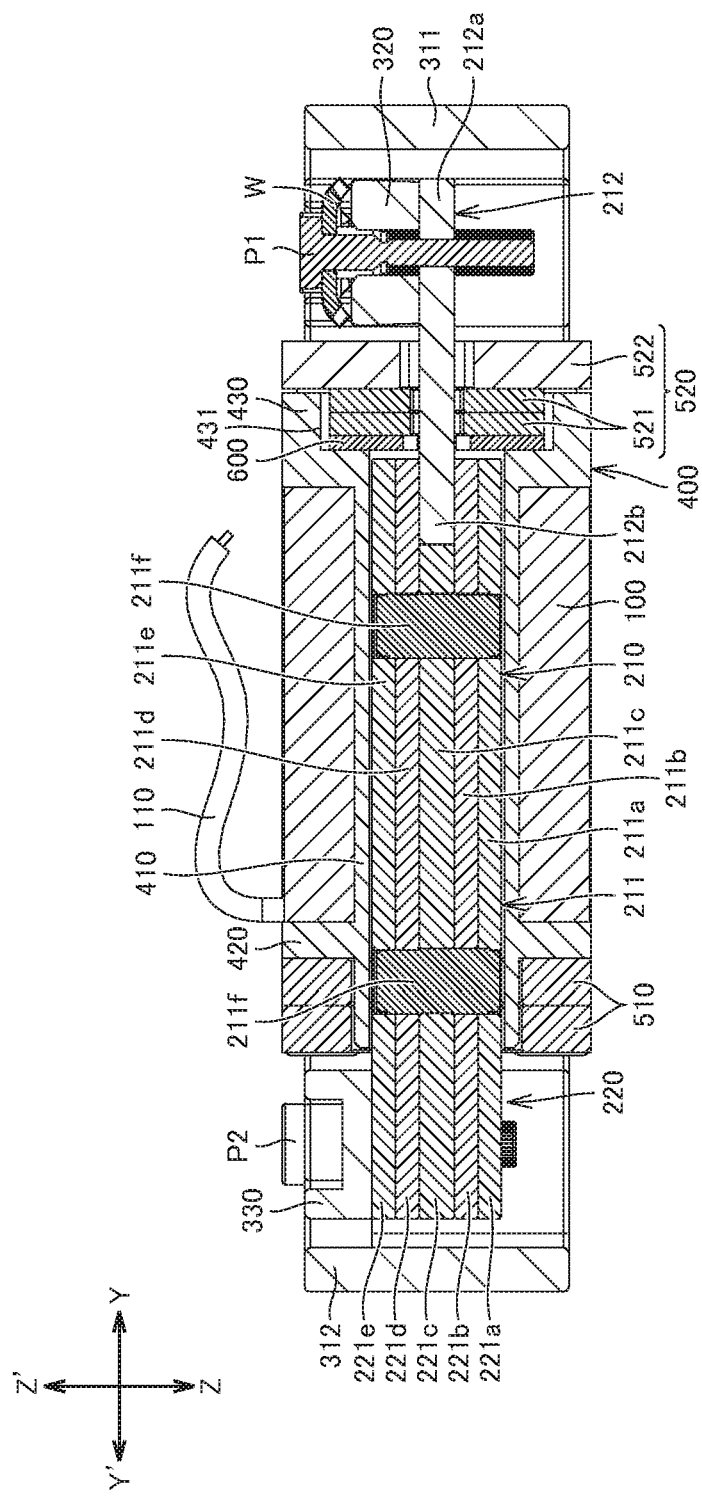
FIG. 2B is a sectional view of the vibration generator, taken along line 2B-2B in FIG. 1B.
Figure 2C:
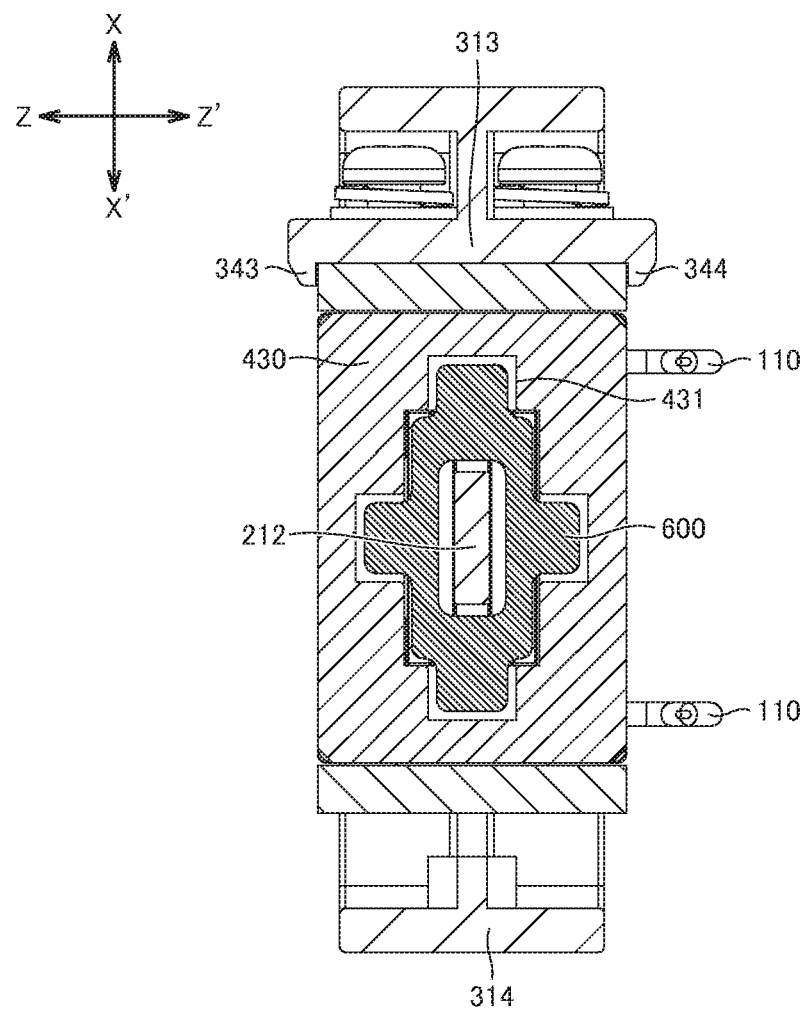
FIG. 2C is a sectional view of the vibration generator, taken along line 2C-2C in FIG. 1B.
Figure 2D:
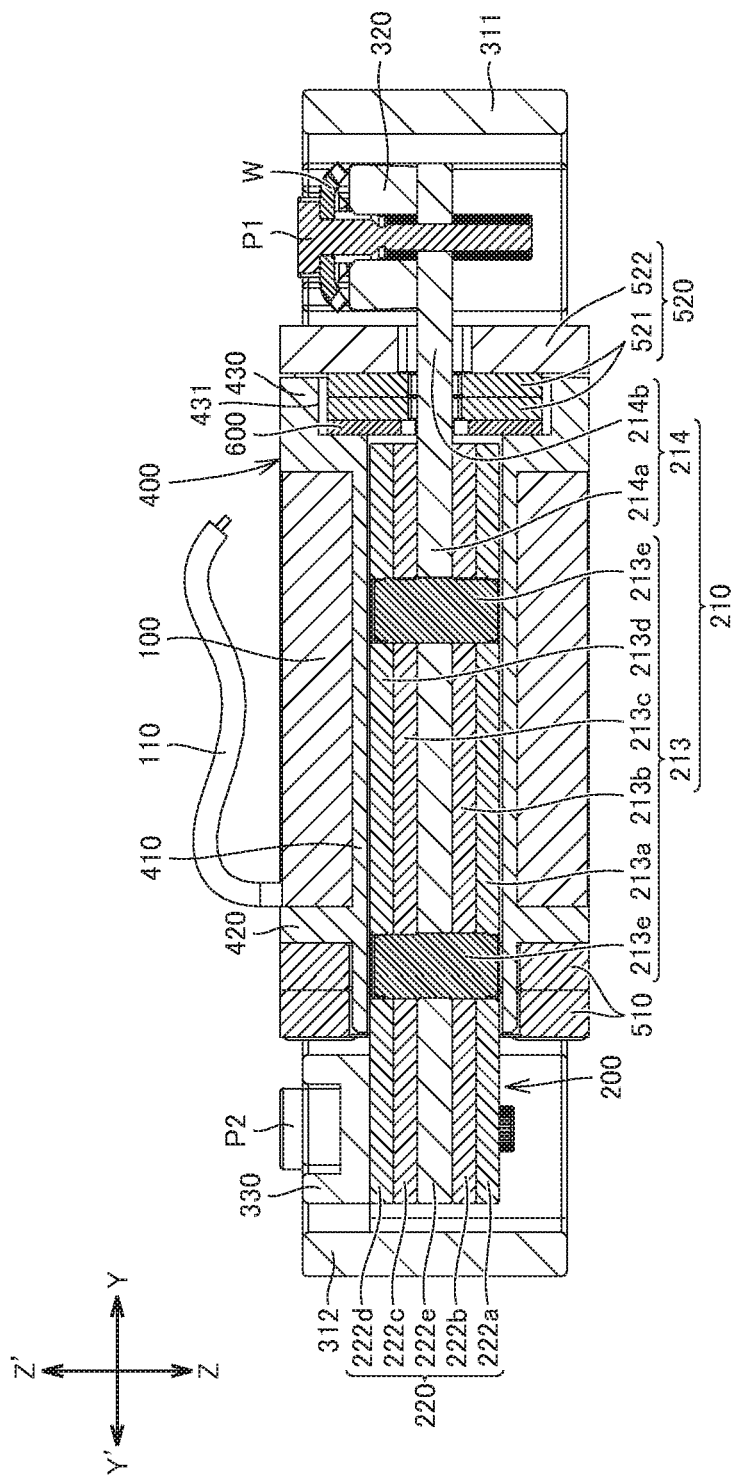
FIG. 2D is a sectional view, corresponding to a view taken along line 2B-2B in FIG. 1B, of another vibration generator including a plunger of another aspect.
Figure 3A:
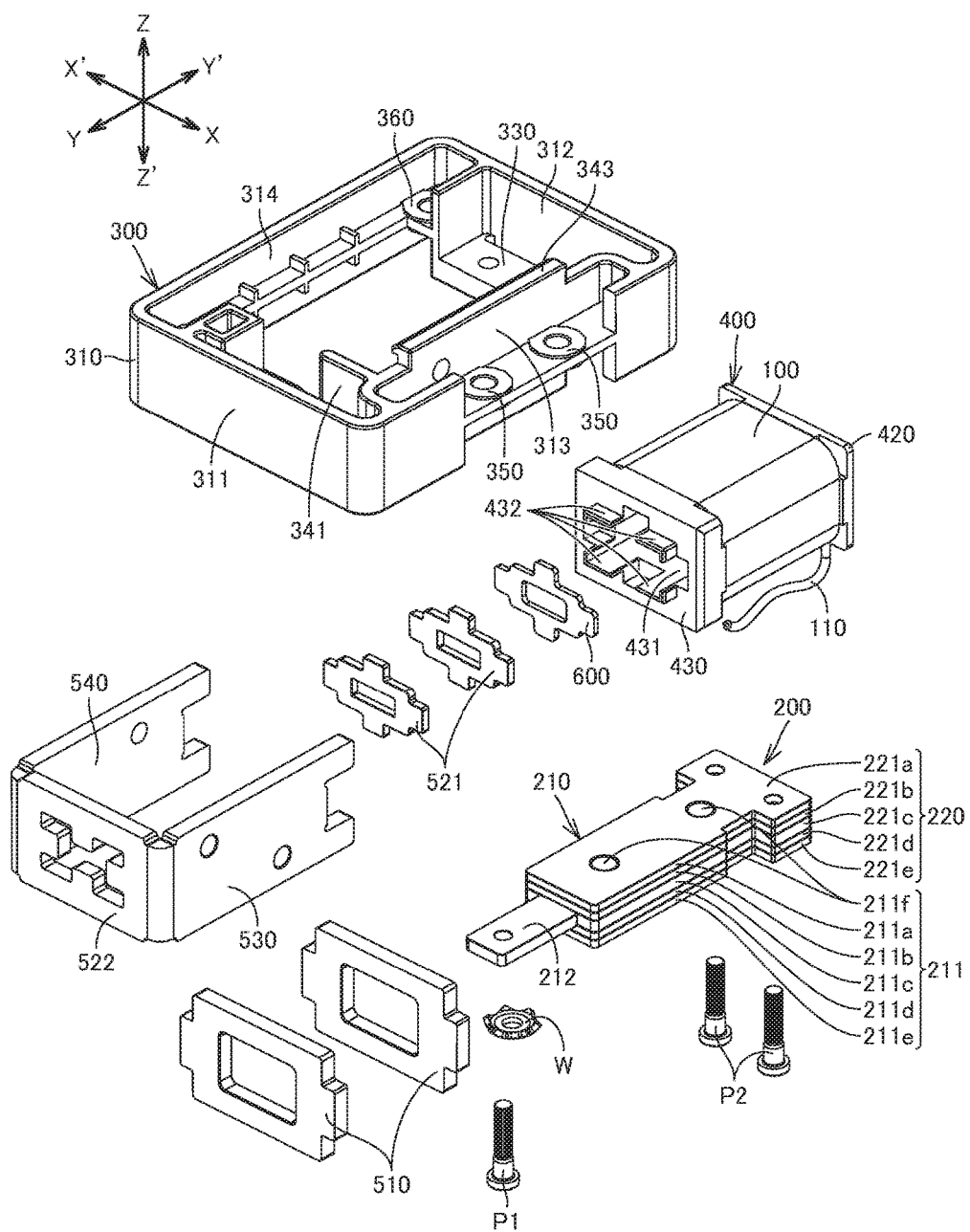
FIG. 3A is a front, top, right perspective exploded view of the vibration generator.
Figure 3B:
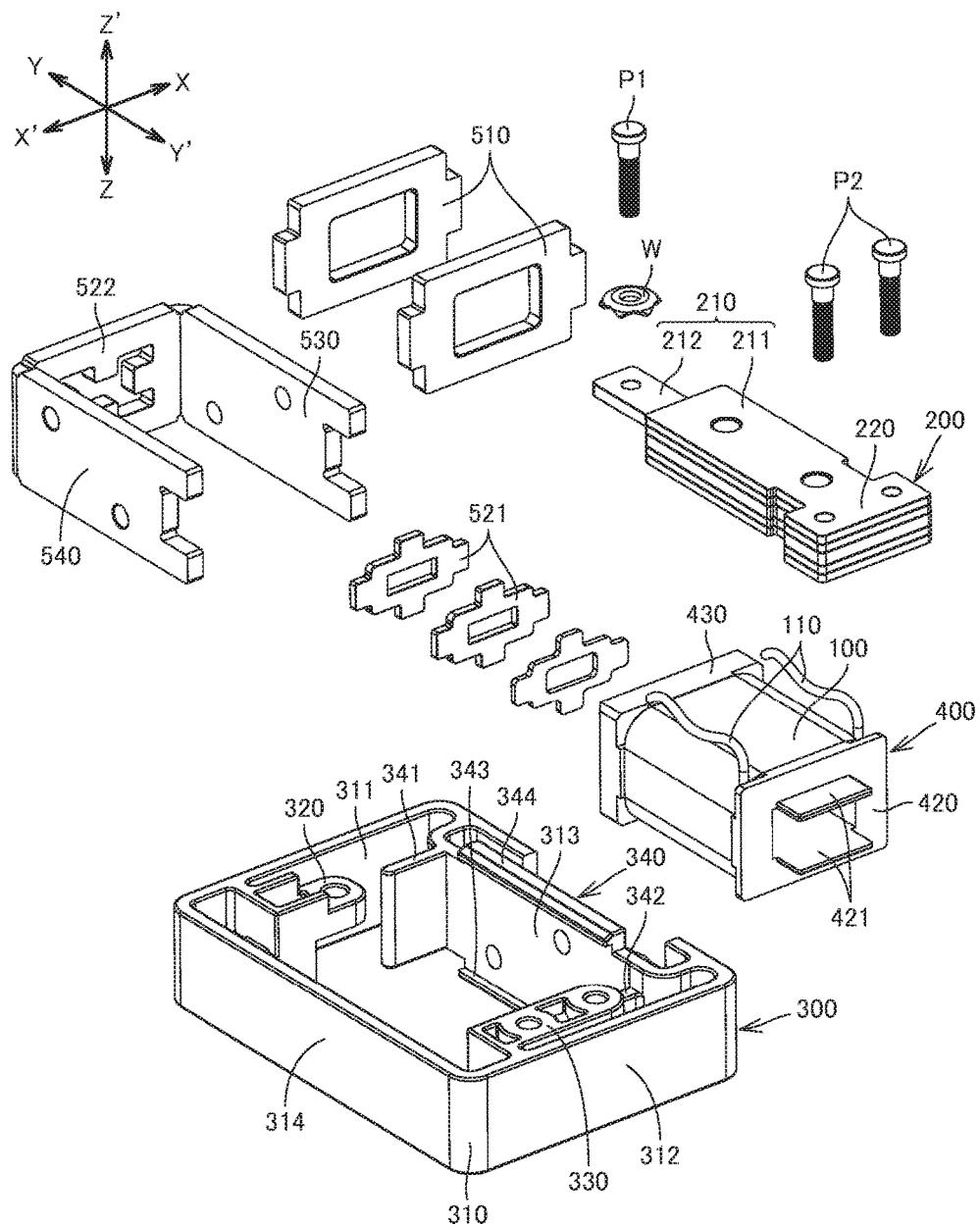
FIG. 3B is a rear, bottom, left perspective exploded view of the vibration generator.

The first shaft 210 of the embodiment shown in FIG. 2D is configured as follows. The third portion 213 of the first shaft 210 includes a plurality of magnetic plates 213a to 213d and a plurality of pins 213e. The plates 213a and 213b are stacked on the Z-direction side of the body 214a of the fourth portion 214 of the first shaft 210, and the plates 213c and 213d are stacked on the Z'-direction side of the body 214a. The fourth portion 214 of the first shaft 210 has a plate shape. The body 214a of the fourth portion 214 is held by and between the plates 213a and 213b on the Z-direction side and the plates 213c and 213d on the Z'-direction side. The body 214a and the plates 213a to 213d are fixed together with the pins 213e. The extension 214b extends in the Y-direction from the Y-direction end of the third portion 213 to be located outside the coil 100.

The third portion 213 of any aspect above may include the plate 213a and/or the plate 213c, or at least one magnetic plate fixed to the Z- or Z'-direction side face of the body 214a of the fourth portion 214. The at least one plate of the third portion 213 and the body 214a of the fourth portion 214 of any aspect above may be fixed together with a known fixing means, such as at least one pin 213e, at least one pin other than the pins 213e, at least one screw, an adhesive, and/or at least one adhesive tape.

The plunger 200 may further include a second shaft 220. The second shaft 220 may preferably extend in the X-X' direction, be disposed on the Y'-direction side relative to the coil 100 with a gap therebetween, and be at least partly made of a magnetic material such as to be magnetically attractable to the coil 100 and thereby movable in the Y-direction from its initial position. The second shaft 220 may be integral with the first shaft 210 or may be a separate component attached to the first shaft 210. The second shaft 220 may be in a shape of a circular cylinder, a polygonal prism, or the like extending in the X-X' direction. The second shaft 220 is larger in X-X' direction dimension than the first shaft 210. The second shaft 220 has a X-direction end portion and a X'-direction end portion (hereinafter referred to as opposite end portions). These opposite end portions of the second shaft 220 may preferably be disposed on the Y'-direction side relative to the coil 100 with a gap therebetween. The initial position of the second shaft 220 of the plunger 200 is the position at which the second shaft 220 is located before elastic deformation of the frame 300.

In the embodiment shown in FIGS. 2A to 2C, 3A, and 3B FIGS. 2A to 2C, 3A, and 3B, the second shaft 220 is configured as follows. The second shaft 220 includes a plurality of magnetic plates 221a to 221e. The plates 221a to 221e are stacked in this order in the Z-Z' direction. The plate 221a is connected integrally with the plate 211a. The plate 221b is connected integrally with the plate 211b. The plate 221c is connected integrally with the plate 211c. The plate 221d is connected integrally with the plate 211d. The plate 221e is connected integrally with the plate 211e.

In the embodiment shown in FIG. 2D, the second shaft 220 is configured as follows. The second shaft 220 includes a plurality of magnetic plates 222a to 222d and a nonmagnetic plate 222e. The plate 222a is connected integrally with the plate 213a. The plate 222b is connected integrally with the plate 213b. The plate 222c is connected integrally with the plate 213c. The plate 222d is connected integrally with the plate 213d. The plate 222e is connected integrally with the body 214a of the fourth portion 214 of the first shaft 210. The plates 222a and 222b are stacked on the Z-direction side of the plate 222e, and the plates 222c and 222d are stacked on the Z'-direction side of the plate 222e. The plate 222e is held by and between the plates 222a and 222b on the Z-direction side and the plates 222c and 222d on the Z'-direction side.

The second shaft 220 of any aspect above may include at least one of the plurality of magnetic plates, or include the plate 222e and at least one magnetic plate fixed to the Z- or Z'-direction side face of the plate 222e. The plates of the second shaft 220 of any aspect above may be fixed together with a known fixing means, such as at least one pin, at least one screw, an adhesive, and/or at least one adhesive tape.

The frame 300 may preferably be fixed to the first shaft 210 of the plunger 200 at a position on the Y-direction side relative to the coil 100, fixed to the second shaft 220 of the plunger 200 at a position on the Y'-direction side relative to the coil 100, and elastically deformable at least partly as a result of movement of the first and second shafts 210 and 220. The frame 300 may be made of an electrically and magnetically insulating resin or of metal.

The frame 300 includes a frame body 310. The frame body 310 surrounds the coil 100 and the plunger 200. The frame body 310 is configured to be elastically deformed at least partly when the coil 100 is energized and the first and second shafts 210 and 220 of the plunger 200 are magnetically attracted toward the coil 100 to move from their initial positions. The frame body 310 is configured to be restored when the coil 100 is de-energized and stops magnetically attracting the first and second shafts 210 and 220 of the plunger 200. When the frame body 310 is restored, the first and second shafts 210 and 220 of the plunger 200 return to their initial positions. Repeated elastic deformation and restoration of the frame body 310 generate vibrations. The level, duration, frequency, etc. of vibrations can be adjusted by varying electrical parameters, e.g. voltage, frequency, or duty ratio, with respect to the energization of the coil 100. The frame body 310 may include an annular shape, a substantially U shape, a substantially V shape, a substantially L shape, or the like.

In the embodiment shown in FIGS. 1A to 3B, the frame body 310 is generally of rectangular loop shape including a first portion 311, a second portion 312, a third portion 313, and a fourth portion 314. The first portion 311 is spaced from and on the Y-direction side relative to the plunger 200. The second portion 312 is spaced from and on the Y'-direction side relative to the plunger 200. The third portion 313 is located on the X-direction side relative to the coil 100 and couples the X-direction end of the first portion 311 and the X-direction end of the second portion 312. The fourth portion 314 is located on the X'-direction side relative to the coil 100 and couples the X'-direction end of the first portion 311 and the X'-direction end of the second portion 312.

The frame 300 further includes a first fixable portion 320 and a second fixable portion 330. The first fixable portion 320 is provided at the frame body 310 such as to be located on the Y-direction side relative to the coil 100. The first fixable portion 320 is fixed to the first shaft 210 of the plunger 200 at a position on the Y-direction side relative to the coil 100. The first fixable portion 320 is fixed to the first shaft 210 with at least one screw or pin P1, an adhesive, at least one adhesive tape, or any other fixing means. The second fixable portion 330 is provided at the frame body 310 such as to be located on the Y'-direction side relative to the coil 100. The second fixable portion 330 is fixed to the second shaft 220 of the plunger 200 at a position on the Y'-direction side relative to the coil 100. The second fixable portion 330 is fixed to the second shaft 220 with at least one screw or pin P2, an adhesive, at least one adhesive tape, or any other fixing means.

The at least one screw or pin P1 and the at least one screw or pin P2 may each include a head. A washer W may be interposed between the head of the or each screw or pin P1 and the first fixable portion 320 and/or between the head of the or each screw or pin P2 and the second fixable portion 330. The interposed washer or washers W serve to suppress disconnection of the at least one screw or pin P1 and/or P2 vibrating as a result of vibrations of the frame body 310. This reduces unintended disengagement of the first fixable portion 320 from the first shaft 210 and/or of the second fixable portion 330 from the second shaft 220. The or each washer W to be held by and between the head of the screw or pin P1 and the first fixable portion 320 may include at least one tooth to dig into the first fixable portion 320. The or each washer W to be held by and between the head of the screw or pin P2 and the second fixable portion 330 may include at least one tooth to dig into the second fixable portion 330. The or each washer W may specifically be a known toothed lock washer or star washer with a plurality of teeth along the inner or outer edge of the washer. In other words, the or each washer may have a plurality of teeth. The provision of the tooth or teeth on the at least one washer W further helps to prevent disconnection of the at least one screw or pin P1 and/or P2. For ease with which the tooth or teeth of the or each washer W can dig into with the first fixable portion 320 and/or the second fixable portion 330, the entire frame 300 or at least one of the first fixable portion 320 and the second fixable portion 330 may be made of plastic material as described above. The screw or pin P1 and/or the screw or pin P2 may have a body with a knurled pattern, which also helps to prevent disconnection of the at least one screw or pin P1 and/or P2.

The first fixable portion 320 may be fixed to the first shaft 210 at a first position. The second fixable portion 330 may be fixed to the second shaft 220 at a second position. The first position is at a first height position and on the Y-direction side relative to the coil 100. The second position is at a second height position and on Y'-direction side relative to the coil 100. The first and second height positions are different height positions in the Z-Z' direction.

In the embodiment shown in FIGS. 1A to 3B, the first and second fixable portions 320 and 330 are configured as follows. The first fixable portion 320 is provided integrally with the first portion 311 of the frame body 310 and fixed to the first shaft 210 at a first position with a screw or pin P1. The second fixable portion 330 is provided integrally with the second portion 312 of the frame body 310 and fixed to the second shaft 220 at a second position with two screws or pins P2. A star washer W with a plurality of teeth is interposed between the head of the screw or pin P1 and the first fixable portion 320, with the teeth digging in the first fixable portion 320.

The vibration generator S may further include an electrically and magnetically insulating bobbin 400. The bobbin 400 includes a trunk 410 and of a tuboid shape with a circular or polygonal section (generally rectangular section in FIGS. 1A to 3B). The coil 100 is wound around trunk 410. The first shaft 210 of the plunger 200 is received in the bobbin 400 and the coil 100 such as to be movable in the Y-Y' direction. More specifically, the first portion 211 or third portion 213 of the first shaft 210 may an outer size or diameter corresponding to the inner size or diameter of the bobbin 400, and the first portion 211 or third portion 213 of the first shaft 210 may be disposed inside the bobbin 400 with a certain clearance therebetween so as to be movable in the Y-Y' direction. The bobbin 400 may holds the terminal for connection with the coil 100. Alternatively, the bobbin 400 may be provided integrally with or attached to the connector for connection with the coil 100.

The vibration generator S may further include at least one first yoke 510. The first yoke 510 is made of soft iron or the like material that can enhance magnetic attraction force of the coil 100. The first yoke 510 is disposed between the second shaft 220 of the plunger 200 and the coil 100. In this case, the opposite end portions of the second shaft 220 are disposed with a gap between themselves and the first yoke 510. The first yoke 510 may be of a loop shape. The first shaft 210 of the plunger 200 is received in the first yoke 510 such as to be movable in the Y-Y' direction.

In the embodiments shown in FIGS. 1A to 3B, the vibration generator S includes a plurality of first yokes 510. The first yokes 510 are loop-shaped plates disposed between the coil 100 and the opposite end portions of the second shaft 220 of the plunger 200. The first shaft 210 of the plunger 200 is received in the first yokes 510 such as to be movable in the Y-Y' direction.

The bobbin 400 may further include a first insulator 420. The first insulator 420 is disposed between the at least one first yoke 510 and the coil 100. The first insulator 420 may be a loop-shaped flange along the Y'-direction end portion of the trunk 410. Alternatively, the first insulator 420 may be a plurality of pieces radially extending from the Y'-direction end portion of the trunk 410. The first insulator 420 may or may not abut the first yokes 510.

In the embodiments shown in FIGS. 1A to 3B, the first insulator 420 is a loop-shaped flange along the Y'-direction end portion of the trunk 410 and has a plurality of supports 421. The first insulator 420 abuts the first yokes 510 from the Y-direction side. The supports 421 are received in the first yokes 510 to support the first yokes 510.

The vibration generator S may further include at least one second yoke 520. The second yoke 520 is made of soft iron or the like material that can enhance magnetic attraction force of the coil 100. The second yoke 520 is disposed on the Y-direction side relative to the coil 100. The second yoke 520 may be disposed on the Y-direction side relative to the coil 100, with a gap between itself and the coil 100 and between itself and the first or third portion 211 or 213 of the first shaft 210 of the plunger 200. The second yoke 520 may be of a loop shape. In this case, the body 212a of the second portion 212 or the extension 214b of the fourth portion 214 of the first shaft 210 of the plunger 200 is received in the second yoke 520 such as to be movable in the Y-Y' direction.

In the embodiments shown in FIGS. 1A to 3B, the vibration generator S includes a plurality of second yokes 520 including a plurality of loop-shaped second yokes 521 and a loop-shaped second yoke 522. In the embodiment of FIGS. 2A and 2B, the second yokes 521 and the second yoke 522 are disposed on the Y-direction side relative to the coil 100 with gaps between themselves and the coil 100 and between themselves and the first portion 211 of the first shaft 210 of the plunger 200. In the embodiment shown in FIG. 2D, the second yokes 521 and the second yoke 522 are disposed on the Y-direction side relative to the coil 100 with a gap between themselves and the coil 100 and between themselves and the third portion 213 of the first shaft 210 of the plunger 200.

The bobbin 400 may further include a second insulator 430. The second insulator 430 is disposed between the at least one second yoke 520 and the coil 100. The second insulator 430 may be a loop-shaped flange along the Y-direction end portion of the trunk 410. Alternatively, the second insulator 430 may be a plurality of pieces radially extending from the Y-direction end portion of the trunk 410. The second insulator 430 may or may not abut the second yokes 520.

In the embodiments shown in FIGS. 1A to 3B, the second insulator 430 is a loop-shaped flange along the Y-direction end portion of the trunk 410. The second insulator 430 has a recess 431 and a plurality of supports 432. The recess 431 opens to the Y-direction side and accommodates the second yokes 521. The second insulator 430 abuts the second yoke 522 from the Y'-direction side. The second yoke 522 is in abutment from the Y-direction side with the second yokes 521 accommodated in the recess 431 of the second insulator 430. The supports 432 extends from the edge of the recess 431 and fit in the second yoke 522 to support the second yoke 522.

The vibration generator S may further include a buffer 600. The buffer 600 is made of an elastic material, such as rubber or a plastic material, and interposed between the at least one first yoke 510 and the first insulator 420 and/or between the at least one second yoke 520 and the second insulator 430. In other words, the buffer 600 is held by and between the at least one first yoke 510 and the first insulator 420 and/or between the at least one second yoke 520 and the second insulator 430. The buffer 600 serves to suppress noises generated by physical contact between the at least one first yoke 510 and the first insulator 420 and/or between the at least one second yoke 520 and the second insulator 430. The buffer 600 may loop-shaped. In this case, the second portion 212 or the extension 214b of the fourth portion 214 of the first shaft 210 of the plunger 200 is received in the buffer 600 such as to be movable in the Y-Y' direction. The buffer 600 may be electrically conductive or insulative.

In the embodiments shown in FIGS. 2A to 3B, the buffer 600 is a loop-shaped member of elastic material, accommodated in the recess 431 of the second insulator 430 together with the second yokes 521, and held by and between the second yokes 520 and the second insulator 430.

The vibration generator S may further include at least one third yoke 530 and at least one fourth yoke 540. The third and fourth yokes 530 and 540 are made of soft iron or the like material that can enhance magnetic attraction force of the coil 100. The third and fourth yokes 530 and 540 extend in the Y-Y' direction and are each larger in Y-Y' direction dimension than the coil 100. The at least one third yoke 530 is disposed on the X-direction side relative to the coil 100, and the at least one fourth yoke 540 is disposed on the X'-direction side relative to the coil 100. The third and fourth yokes 530 and 540 may or may not abut the first insulator 420 and the second insulator 430.

The third and fourth yokes 530 and 540 each have a Y'-direction end portion and a Y-direction end portion. The Y'-direction end portions of the third and fourth yokes 530 and 540 may be coupled to the at least one first yoke 510 at positions on the Y'-direction side relative to the coil 100. This coupling may specifically be such that the Y'-direction end portions of the third and fourth yokes 530 and 540 are integrated with the first yoke 510, or such that the Y'-direction end portions of the third and fourth yokes 530 and 540 are provided with engagement projections to engage with the at least one first yoke 510, or such that the at least one first yoke 510 is provided with engagement projections to engage with the Y'-direction end portions of the third and fourth yokes 530 and 540. The Y-direction end portions of the third and fourth yokes 530 and 540 may be coupled to the at least one second yoke 520 at positions on the Y-direction side relative to the coil 100, in a similar manner to the coupling between the Y'-direction end portions of the third and fourth yokes 530 and 540 and the at least one first yoke 510.

The first, third, and fourth yokes 510, 530, 540 may be coupled together to hold the bobbin 400 in the X-X' direction. In other words, the first, third, and fourth yokes 510, 530, 540, the bobbin 400, and the coil 100 may be combined in a single unit (hereinafter referred to as a unit 1 for convenience of description). In the unit 1, the bobbin 400 is held in the X-X' direction between the at least one third yoke 530 and the at least one fourth yoke 540. At least one of the yokes of the unit 1 may be fixed to the frame 300. Alternatively, the second, third, and fourth yoke 520, 530, 540 may be coupled together to hold the bobbin 400 in the X-X' direction. In other words, the second, third, and fourth yoke 520, 530, 540, the bobbin 400, and the coil 100 may be combined in a single unit (hereinafter referred to as a unit 2 for convenience of description). In the unit 2, the bobbin 400 is held in the X-X' direction between the at least one third yoke 530 and the at least one fourth yoke 540. At least one of the yokes in the unit 2 may be fixed to the frame 300. Alternatively, the first, second, third, and fourth yokes 510, 520, 530, 540 may be coupled together to hold the bobbin 400 in the X-X' direction and/or in the Y-Y' direction. In other words, the first, second, third, and fourth yokes 510, 520, 530, 540, the bobbin 400, and the coil 100 may be combined in a single unit (hereinafter referred to as a unit 3 for convenience of description). In the unit 3, the bobbin 400 is held in the Y-Y' direction between the at least one first yoke 510 and the at least one second yoke 520 and/or held in the X-X' direction between the at least one third yoke 530 and the at least one fourth yoke 540. At least one of the yokes of the unit 3 may be fixed to the frame 300.

In the embodiments shown in FIGS. 1A to 3B, the third and fourth yokes 530 and 540 are configured as follows. The Y-direction end portions of the third and fourth yokes 530 and 540 are integrally coupled to the second yoke 520 to form a generally U-shape. The X-direction end portions of the two first yokes 510 are formed with engagement projections (first engagement projections) in engagement with an engagement recess in the Y'-direction end portion of the third yoke 530, and the X'-direction end portions of the two first yokes 510 are formed with engagement projections (second engagement projections) in engagement with an engagement recess in the Y'-direction end portion of the fourth yoke 540, so that the first yokes 510 are couple to the Y'-direction end portions of the third and fourth yokes 530 and 540. The first, second, third, and fourth yokes 510, 520, 530, 540 thus coupled together hold the bobbin 400 in the Y-Y' direction and in the X-X' direction. The third yoke 530 is fixed to the third portion 313 of the frame 300 with a screw.

The frame 300 may further include a positioner 340. The positioner 340 is provided at the frame body 310 to retain the unit 1, 2, or 3 in position. The positioner 340 may include retainers 341 and 342. The retainers 341 and 342 are provided at the third portion 313 and/or the fourth portion 314 of the frame body 310 to be spaced from each other in the Y-Y' direction and retrain the unit 1, 2, or 3 in position in the Y-Y' direction. In the case where there is provided the unit 1 retained in position by the retainers 341 and 342, the retainer 341 abuts the bobbin 400 of the unit 1 from the Y-direction side, and the retainer 342 abuts the at least one first yokes 510 of the unit 1 from the Y'-direction side. In the case where there is provided the unit 2 retained in position by the retainers 341 and 342, the retainer 341 abuts the at least one second yoke 520 of the unit 2 from the Y-direction side, and the retainer 342 abuts the bobbin 400 of the unit 2 from the Y'-direction side. In the case where there is provided the unit 3 retained in position by the retainers 341 and 342, the retainer 341 abuts the at least one second yoke 520 of the unit 3 from the Y-direction side, and the retainer 342 abuts the at least one first yoke 510 of the unit 3 from the Y'-direction side.

The positioner 340 may further include retainers 343, 344. The retainers 343, 343 are provided at the third portion 313 and/or the fourth portion 314 of the frame body 310 to be spaced from each other in the Z-Z' direction and retrain the unit 1, 2, or 3 in position in the Z-Z' direction. In this case, the retainer 343 abuts the at least one third or fourth yoke 530 or 540 from the Z-direction side, and the retainer 344 abuts the at least one third or fourth yoke 530 or 540 from the Z'-direction side.

In the embodiments shown in FIGS. 1A to 3B, the positioner 340 includes retainers 341 to 344. The retainers 341 and 342 are provided at the third portion 313 of the frame body 310 to be spaced from each other in the Y-Y' direction. The retainer 341 abuts the second yoke 522 of the unit 3 from the Y-direction side, and the retainer 342 abuts the first yokes 510 of the unit 3 from the Y'-direction side. The retainers 343 and 344 are provided at the third portion 313 of the frame body 310 to be spaced from each other in the Z-Z' direction. The retainer 343 abuts the third yoke 530 of the unit 3 from the Z-direction side, and the retainer 344 abuts the third yoke 530 of the unit 3 from the Z'-direction side. The positioner 340 may be a recess or recesses configured to retain the unit 1, 2, or 3 in position in the Y-Y' direction and/or in the X-X' direction.

The frame 300 may further include at least one third fixable portion 350 and at least one fourth fixable portion 360. The third fixable portion 350 is provided at the frame body 310 and configured to be fixed to a fixable part 10 of an electronic device D (to be described). The fourth fixable portion 360 is provided at the frame body 310 and configured to fixed to a vibratable part 20 (to be described) of the electronic device D. The fourth fixable portion 360 may be coupled to at least one of the first fixable portion 320 or the second fixable portion 330 of the frame 300.

The at least one fourth fixable portion 360 may be a pair of fourth fixable portions. In this case, one of the fourth fixable portions 360 is provided at the frame body 310 and configured to be fixed to the vibratable part 20 of the electronic device D at a position on the Y-direction side relative to the at least one third fixable portion 350. The other fourth fixable portion 360 is provided at the frame body 310 and configured to be fixed to the vibratable part 20 of the electronic device D at a position on the Y' side relative to the at least one third fixable portion 350. In other words, the at least one third fixable portion 350 is provided at the frame body 310 to be located between the pair of fourth fixable portions 360 in the Y-Y' direction. Owing to such arrangement of the at least one third fixable portion 350 and the pair of fourth fixable portions 360, vibrations generated at the frame body 310 are unlikely to travel to the fixable part 10 but easily travel to the vibratable part 20. The one of the fourth fixable portions 360 may be coupled to the first fixable portion 320 of the frame 300. The other fourth fixable portion 360 may be coupled to the second fixable portion 330 of the frame 300.

In the embodiments shown in FIGS. 1A to 3B, two third fixable portions 350 and two fourth portions 314. The third fixable portions 350 are contiguous plates, each with a screw hole, provided at the third portion 313 of the frame body 310. The one of the fourth fixable portions 360 is a fixable plate with a screw hole, provided at the Y-direction end of the fourth portion 314 of the frame body 310. The other fourth fixable portion 360 is a fixable plate with a screw hole, provided at the Y'-direction end of the fourth portion 314 of the frame body 310.

The frame body 310 in its original configuration constitutes a generally rectangular linkage formed by the first, second, third and fourth portions 311, 312, 313 and 314 of the frame body. The plunger 200 is fixed relative to the fourth frame portion 314 by the screws or pins P1 and P2, while the coil 100 is held by the retainers 341 and 342 against movement in the Y-Y' direction relative to the third frame portion 313. When the coil 100 is energized, the plunger 200 moves in the Y direction relative to the coil 100, and thus the fourth frame portion 314 moves with the plunger 200 in the Y direction relative to the third frame portion 313. In this manner, the frame body 310 can be deformed into a generally parallelogram shape. The first and second frame portions 311 and 312 are resiliently flexed by this relative movement. When the coil ceases to be energized, the resilience of the first and second frame portions 311 and 312 returns the frame to its original, unstressed, configuration.

The vibration generator S according to the aspects shown in FIGS. 1A to 3B may be assembled in the following steps. There are prepared the bobbin 400 with the coil 100 wound therearound, the buffer 600, and the two second yokes 521. The buffer 600 and the second yokes 521 are placed in this order into the recess 431 of the second insulator 430 of the bobbin 400. Subsequently prepared are the second yoke 522, the third yoke 530, and the fourth yoke 540 as coupled together (hereinafter referred to as a U-yoke). The supports 432 of the second insulator 430 of the bobbin 400 are fitted into the hole in the second yoke 522 of the U-yoke, and the second yoke 522 is brought into abutment with the second insulator 430 and with the second yokes 521 inside the recess 431 of the second insulator 430. Also, the third yoke 530 and the fourth yoke 540 of the U-yoke are respectively disposed on the X- and X'-direction sides relative to the bobbin 400 and the coil 100. Accordingly, the third yoke 530 abuts the first insulator 420 and the second insulator 430 of the bobbin 400 from the X-direction side, and the fourth yoke 540 abuts the first insulator 420 and the second insulator 430 from the X'-direction side.

Also prepared are the two first yokes 510. The first engagement projections of the first yokes 510 are brought into engagement with the engagement recess of the third yoke 530, and the second engagement projections of the first yokes 510 are brought into engagement with the engagement recess of the fourth yoke 540. The first yokes 510 thus abuts the first insulator 420 of the bobbin 400 and couple between the third yoke 530 and the fourth yoke 540 at a position on the Y'-direction side relative to the coil 100. The first yokes 510, the second yoke 522, the third yoke 530, the fourth yoke 540, and the bobbin 400 with the coil 100 are combined into a single unit, i.e. the unit 3.

Subsequently prepared is the plunger 200 in a T-plate shape. The plunger 200 may be configured as shown in FIGS. 2A to 2C or as shown in FIG. 2D. The first shaft 210 of the plunger 200 is inserted into the first yokes 510, the bobbin 400, the buffer 600, the second yokes 521, and the second yoke 522. In the plunger 200 thus inserted, the second portion 212 or the fourth portion 214 of the first shaft 210 projects in the Y-direction out of the bobbin 400, the buffer 600, the second yokes 521, and the second yoke 522, and the second shaft 220 is disposed on the Y'-direction side relative to the coil 100 with a gap between itself and the second yoke 522.

The frame 300 is also prepared. The unit 3 and the plunger 200 are placed inside the frame body 310 of the frame 300, so that the positioner 340 of the frame 300 retains the unit 3 in position. The third yoke 530 of the unit 3 is then fixed to the frame 300 with a screw. The second portion 212 or the fourth portion 214 of the plunger 200 is then fixed to the first fixable portion 320 of the frame 300 with the screw or pin P1. The washer W, which is a star washer, is interposed between the first fixable portion 320 and the screw or pin P1. Meanwhile, the second shaft 220 of the plunger 200 is fixed to the second fixable portion 330 with the screws or pins P2. This is how the vibration generator S is assembled.

An electronic device D according to embodiments of the invention will now be described below with reference to FIGS. 4A to 5C. Examples of the electronic device D include car navigation systems for motor vehicles, information terminals (e.g. tablet computers, smartphones, handheld gaming devices, electronic dictionaries, personal computers, etc.), facsimile devices, printers, scanners, arcade game machines, guide boards, automated teller machines, and ticket machines. The electronic device D includes a touch sensing device (not shown), at least one vibration generator S of any aspect above, a fixable part 10, and a vibratable part 20. In the embodiment shown in FIGS. 4A to 4C, three vibration generators S are provided. In the embodiment shown in FIGS. 5A to 5C, one vibration generator S is provided.

The vibratable part 20 is connected to the frame 300 of the vibration generator S and configured to be vibrated as a result of repeated elastic deformation and restoration of the frame 300. The vibratable part 20 at least includes a vibratable plate and the touch sensing device. The touch sensing device is fixed directly or indirectly to the vibratable plate. Vibrations generated by the vibration generator S travel to the touch sensing device via the vibratable plate. The vibrations in the touch sensing device can be felt by a user touching the touch sensing device, and the user recognize the vibrations as tactile acknowledgements of the touch action on the touch sensing device.

Figure 4A:
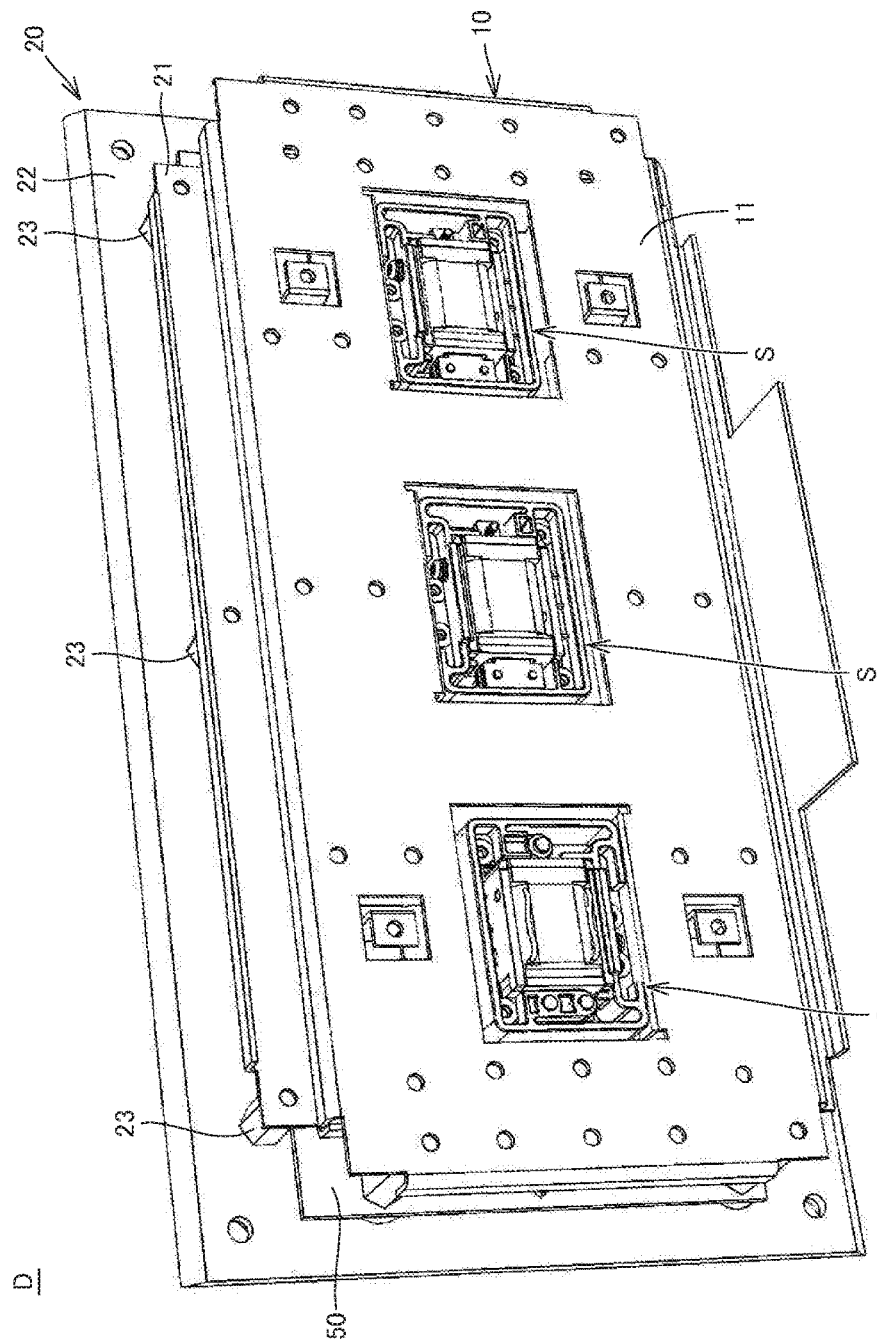
FIG. 4A is a perspective view of an electronic device of an embodiment of the invention.
Figure 4B:
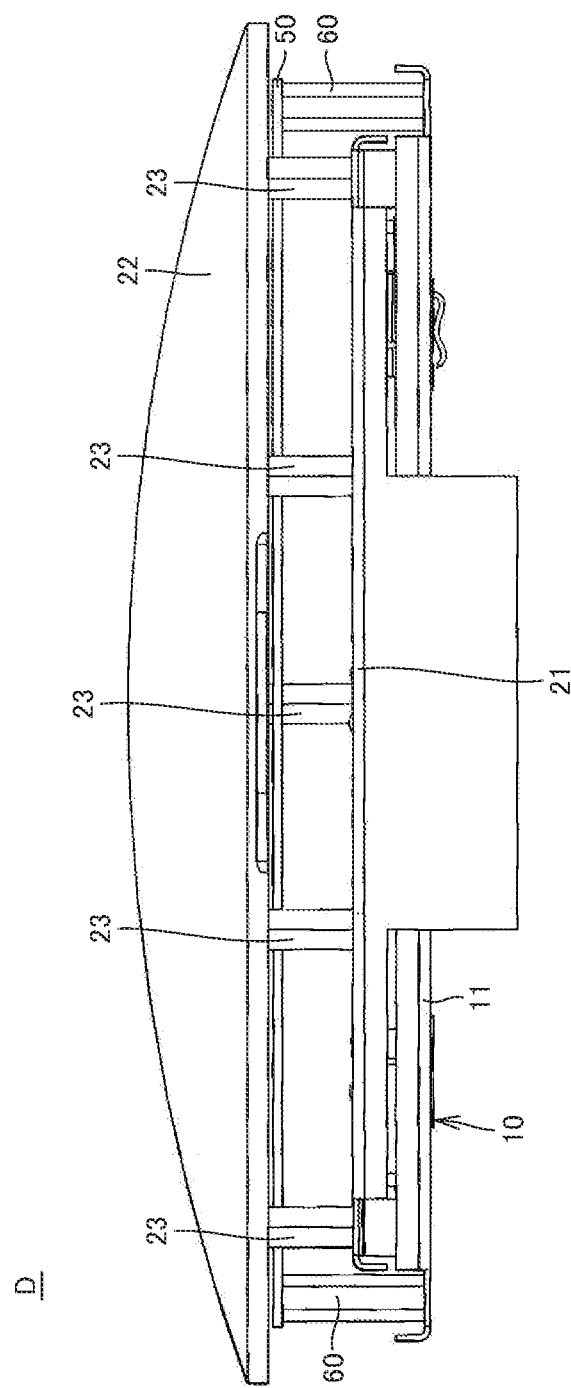
FIG. 4B is a front view of the electronic device.
Figure 4C:
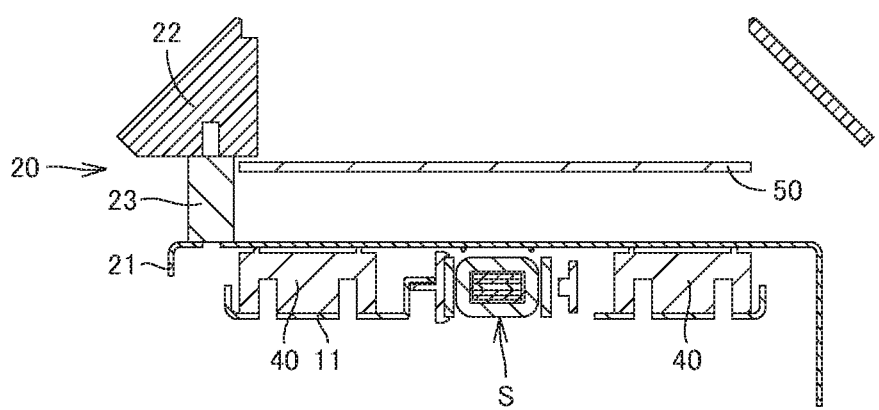
FIG. 4C is an end view of the electronic device.

FIGS. 4A to 4C show an example of the vibratable part 20. The vibratable part 20 includes a vibratable plate 21, a support frame 22, and the touch sensing device. The vibratable plate 21 is disposed on one side (hereinafter referred to as the upper side for convenience of description) of the three vibration generators S in an opposed manner. The vibratable plate 21 is fixed to the pair of fourth fixable portions 360 of the frame 300 of each of the three vibration generators S via spacers (not shown) interposed therebetween. The support frame 22 is fixed to the vibratable plate 21 via a plurality of spacers 23 interposed therebetween and located on the upper side of the vibratable plate 21. The touch sensing device is attached to and supported by the support frame 22. Vibrations generated by the vibration generators S travel to the touch sensing device via the vibratable plate 21 and the support frame 22.

Figure 5A:
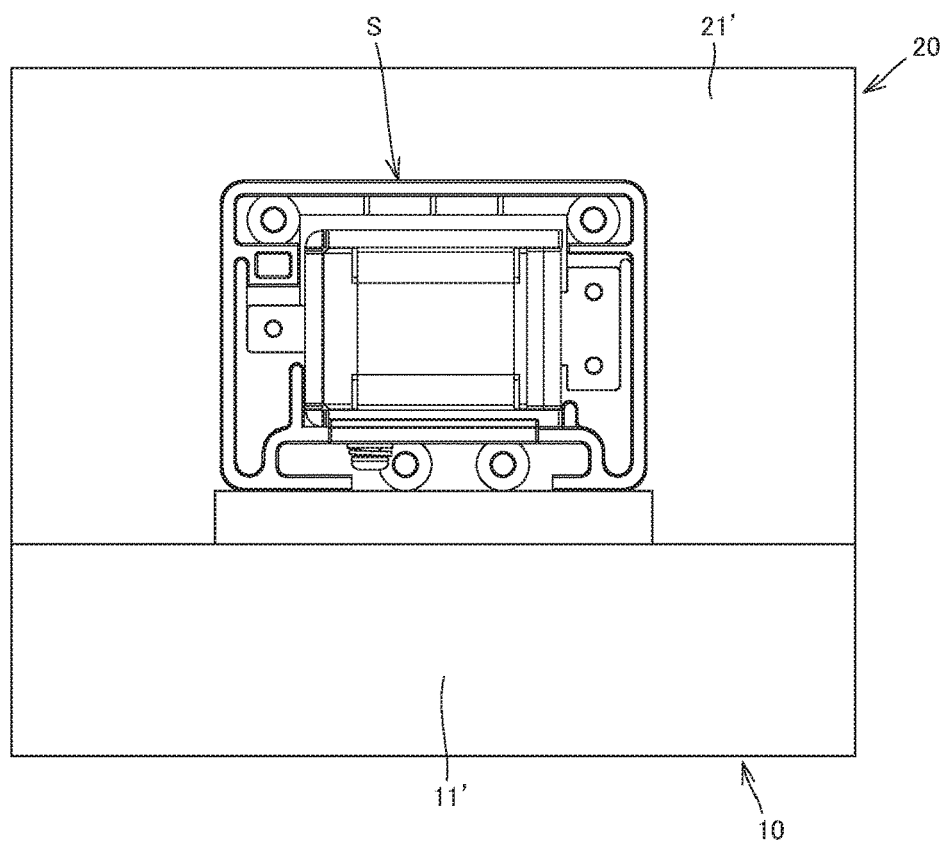
FIG. 5A is a plan view of an electronic device according to another embodiment of the invention.
Figure 5B:
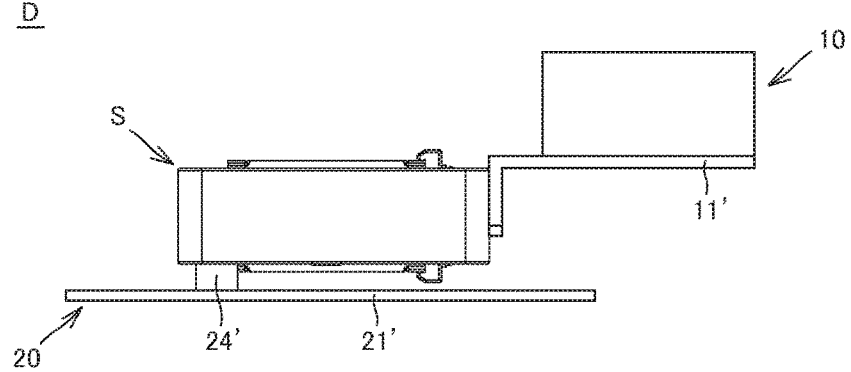
FIG. 5B is a side view of the electronic device.
Figure 5C:
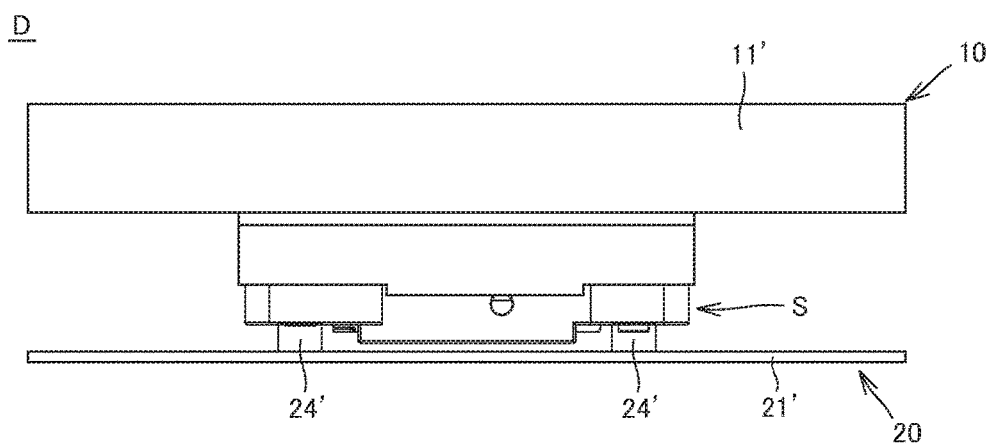
FIG. 5C is a front view of the electronic device.

FIGS. 5A to 5C show another example of the vibratable part 20. The vibratable part 20 includes a vibratable plate 21' and the touch sensing device. The vibratable plate 21' is disposed on one side of the vibration generator S in an opposed manner and fixed to the pair of fourth fixable portions 360 of the frame 300 of the vibration generator S via a spacer 24' interposed therebetween. The touch sensing device is fixed directly or indirectly to the vibratable plate 21'. Vibration generated by the vibration generator S travel to the touch sensing device via the vibratable plate 21'.

The fixable part 10 is fixed to the frame 300 of the or each vibration generator S. The fixable part 10 may include a fixable plate. The fixable plate is fixed directly or indirectly to at least one of the third fixable portions 350 of the frame 300 of the or each vibration generator S and fixed directly or indirectly to a frame, a body, or other part of the electronic device.

FIGS. 4A to 4C show an example of the fixable part 10. The fixable part 10 includes a fixable plate 11. The fixable plate 11 is disposed on the other side (hereinafter referred to as the lower side for convenience of description) of the three vibration generators S in an opposed manner. The fixable part 10 is fixed directly to the two third fixable portions 350 of the frame 300 of each of the three vibration generators S. A plurality of spacers 40 is interposed between the fixable plate 11 and the vibratable plate 21.

FIGS. 5A to 5C show another example of the fixable part 10. The fixable part 10 includes a fixable plate 11'. The fixable plate 11' is fixed directly to the two third fixable portions 350 of the frame 300 of the vibration generator S and extends in a direction to be separated from the vibration generator S.

The electronic device D may further include a circuit board 50. The circuit board 50 is connected to the at least one vibration generator S and the touch sensing device. In the embodiment shown in FIGS. 4A to 4C, the circuit board 50 is disposed between the vibratable plate 21 and the support frame 22 and fixed to the fixable plate 11 via a spacer 60 interposed therebetween. The circuit board 50 is not shown in FIGS. 5A to 5C for convenience of illustration.

The vibration generator S and the electronic device D configured as described above has at least the following technical features. Firstly, the coil 100 provides enhanced magnetic attraction force applied to the plunger 200 for the following reasons (1) to (4). (1) The coil 100 magnetically attracts the second shaft 220 as well as the first shaft 210 of the plunger 200. The first shaft 210 of the plunger 200 is inserted in the bobbin 400 to lower the magnetic resistance of the first shaft 210. This enhances the magnetic attraction force of the coil 100 applied to the first shaft 210. (2) In the case where the vibration generator S includes the at least one first yoke 510, the at least one first yoke 510 is interposed between the coil 100 and the second shaft 220 of the plunger 200. The existence of the at least one first yoke 510 enhances magnetic attraction force of the coil 100 applied to the second shaft 220. (3) In the case where the vibration generator S includes the at least one second yoke 520, the at least one second yoke 520 is disposed with a gap between itself and the coil 100 and between itself and the first or third portion 211 or 213, which is made of a magnetic material, of the plunger 200. This arrangement enhances the magnetic attraction force of the coil 100 applied to the first shaft 210. (4) In the case where the vibration generator S includes the third yoke 530 and the fourth yoke 540, the third yoke 530 extends in the Y-Y' direction on the X-direction side relative to the coil 100, the fourth yoke 540 extends in the Y-Y' direction on the X'-direction side relative to the coil 100. The existence of the third yoke 530 and the fourth yoke 540 also enhances magnetic attraction force of the coil 100 applied to the plunger 200.

Secondly, the vibration generator S is easy to assemble especially in the case where the bobbin 400 is retained by the first, third, fourth yokes 510, 530, 540 coupled together, or by the second, third, and fourth yokes 520, 530, 540 coupled together, or by the first, second, third, and fourth yokes 510, 520, 530, 540 coupled together. This is because the coupled yokes retaining the bobbin 400 form a unitized combination of the yokes, the bobbin 400, and the coil 100. The unit, namely the unit 1, 2, or 3, can be fixed to the frame 300 easily by fixing at least one of the coupled yokes to the frame 300.

Thirdly, in the case where the first shaft 210 of the plunger 200 is fixed to the first fixable portion 320 of the frame 300 at the first position while the second shaft 220 of the plunger 200 is fixed to the second fixable portion 330 of the frame 300 at the second position, such arrangements make it easier to elastically deform the frame 300 as a result of movements of the plunger 200. This is because setting the first and second positions at different heights makes it easier to warp the frame body 310 of the frame 300 as a result of movements of the plunger 200.

Fourthly, the vibration generator S, if having any of the following configurations (1) or (2), suppresses disconnection of the screws or pins P1, P2. (1) The screws or pins P1, P2 have knurled patterns. (2) The head of the screw or pin P1 and the first fixable portion 320 of the frame 300 holds the washer W therebetween and at least one tooth of the washer W digs into the first fixable portion 320, and/or the head of the or each screw or pin P2 and the second fixable portion 330 of the frame 300 holds the washer W therebetween and at least one tooth of the washer W digs into the second fixable portion 330.

It should be appreciated that the vibration generator and the electronic device described above are not limited to the above embodiments but can be modified in any manner within the scope of the claims. Specific modifications will be described in detail below.

The vibration generator of the invention may further include a biasing part of an elastic material, such as a coil spring and a rubber member. This biasing part may be interposed between a first abuttable part and a second abuttable part to bias the plunger in the direction of restoration movement, i.e. to the other side in the first direction. The first abuttable part may preferably be a part of the first shaft of the plunger that projects from the coil and/or the bobbin. In this case, the first shaft may preferably be fixed to the frame at a position on the one side in the first direction relative to the first abuttable part. The second abuttable part may preferably be a part of the bobbin, a part of the coil, or a part of the at least one second yoke. The biasing part may be of a tuboid shape. In this case, the biasing part may receive therein the part of the first shaft of the plunger that projects from the coil and/or the bobbin.

The vibration generator of the invention may not include any of the second shaft of the plunger, the bobbin, and/or the first, second, third, and/or fourth yoke.

The vibration generator of the invention is applicable also to an electronic device including no touch sensing device. Such an electronic device may preferably include a part configured to be vibrated as a result of vibrations generated by the vibration generator of the invention.

It should be appreciated that the above embodiments and variants of the vibration generator and the electronic device are described above by way of examples only. The materials, shapes, dimensions, numbers, arrangements, and other configurations of the constituents of the multilayer printed wiring board and the connection structure may be modified in any manner if they can perform similar functions. The configurations of the embodiments and the variants described above may be combined in any possible manner. The first direction may be any direction of movement and restoration of the plunger of any aspect above. The second direction may be any direction orthogonal to the first direction. The third direction may be any direction crossing the first and second directions.

REFERENCE SIGNS LIST

S: Vibration generator
  100: Coil
  200: Plunger
    210: First shaft
      211: First portion
        211a: Plate
        211b: Plate
        211c: Plate
          211c1: Engagement hole
        211d: Plate
        211e: Plate
        211f: Pin
      212: Second portion
        212a: Body
        212b: Engagement projection
      213: Third portion
        213a: Plate
        213b: Plate
        213c: Plate
        213d: Plate
        213e: Pin
      214: Fourth portion
        214a: Body
        214b: Extension
    220: Second shaft
      221a: Plate
      221b: Plate
      221c: Plate
      221d: Plate
      221e: Plate
      222a: Plate
      222b: Plate
      222c: Plate
      222d: Plate
      222e: Plate
  300: Frame
    310: Frame body
      311: First portion
      312: Second portion
      313: Third portion
      314: Fourth portion
    320: First fixable portion
    330: Second fixable portion
    340: Positioner
      341: Retainer
      342: Retainer
    350: Third fixable portion
    360: Fourth fixable portion
  400: Bobbin
    410: Trunk
    420: First insulator
    430: Second insulator
      431: Recess
  510: First yoke
  520: Second yoke
    521: Second yoke
    522: Second yoke
  530: Third yoke
  540: Fourth yoke
  600: Buffer
  P1: Screw or pin
  P2: Screw or pin
  W: Washer
D: Electronic device
  10: Fixable part
    11: Fixable plate
  20: Vibratable part
    21: Vibratable plate
    22: Support frame
    23: Spacer
  40: Spacer
  50: Substrate
  60: Spacer
D: Electronic device
  10: Fixable part
    11': Fixable plate
  20: Vibratable part
    21': Vibratable plate
    24': Spacer

The invention claimed is:

1. A vibration generator comprising:
a coil;
a plunger including:
  a first shaft received in the coil such as to be movable in a first direction and at least partly made of a magnetic material so as to be magnetically attractable to the coil and thereby movable to one side in the first direction, and
  a second shaft extending in a second direction orthogonal to the first direction, being disposed on the other side in the first direction relative to the coil with a gap therebetween, and being at least partly made of a magnetic material so as to be magnetically attractable to the coil and thereby movable to the one side in the first direction; and
a frame fixed to the first shaft at a position on the one side in the first direction relative to the coil, fixed to the second shaft at a position on the other side in the first direction relative to the coil, and elastically deformable at least partly as a result of movement of the first and second shafts.

2. The vibration generator according to claim 1, wherein the first shaft of the plunger includes:
a first portion of a magnetic material received in the coil, and
a second portion of a nonmagnetic material extending from the first portion to the one side in the first direction to be located outside the coil.

3. The vibration generator according to claim 2, further comprising at least one second yoke on the one side in the first direction relative to the coil, with a gap between the at least one second yoke and the coil and between the at least one second yoke and the first portion of the plunger.

4. The vibration generator according to claim 3, further comprising:

a third yoke disposed on one side in the second direction relative to the coil and extending in the first direction; and a fourth yoke disposed on the other side in the second direction relative to the coil and extending in the first direction, wherein the second yoke couples the third yoke and the fourth yoke at a position on the one side in the first direction relative to the coil.

5. The vibration generator according to claim 4, further comprising a bobbin having a tuboid shape and an insulation property, wherein
the coil is wound around the bobbin,
the second, third, and fourth yokes holds the bobbin, and
at least one of the second, third, or fourth yokes is fixed to the frame.

6. The vibration generator according to claim 3, further comprising a bobbin having a tuboid shape and an insulation property, the bobbin including:
a trunk with the coil wound therearound, and
a second insulator between the second yoke and the coil, wherein the first shaft of the plunger is received in the coil and the trunk of the bobbin.

7. The vibration generator according to claim 6, further comprising a buffer held by and between the second yoke and the second insulator.

8. The vibration generator according to claim 1, wherein the first shaft of the plunger includes:
a third portion of a magnetic material received in the coil, and
a fourth portion of a nonmagnetic material including:
a body fixed to the third portion and located inside the coil, and
an extension extending from the body to the one side in the first direction to be located outside the coil.

9. The vibration generator according to claim 8, further comprising at least one second yoke on the one side in the first direction relative to the coil, with a gap between the least one second yoke and the coil and between the least one second yoke and the third portion of the plunger.

10. The vibration generator according to claim 9, further comprising:
a third yoke disposed on one side in the second direction relative to the coil and extending in the first direction; and
a fourth yoke disposed on the other side in the second direction relative to the coil and extending in the first direction, wherein
the second yoke couples the third yoke and the fourth yoke at a position on the one side in the first direction relative to the coil.

11. The vibration generator according to claim 10, further comprising a bobbin having a tuboid shape and an insulation property, wherein
the coil is wound around the bobbin,
the second, third, and fourth yokes holds the bobbin, and
at least one of the second, third, or fourth yokes is fixed to the frame.

12. The vibration generator according to claim 1, further comprising at least one first yoke between the second shaft of the plunger and the coil,
wherein the second shaft is disposed with a gap between the second shaft and the at least one first yoke.

13. The vibration generator according to claim 12, further comprising:

a third yoke disposed on one side in the second direction relative to the coil and extending in the first direction; and
a fourth yoke disposed on the other side in the second direction relative to the coil and extending in the first direction, wherein
the first yoke couples between the third yoke and the fourth yoke at a position on the other side in the first direction relative to the coil.

14. The vibration generator according to claim 13, further comprising a bobbin having a tuboid shape and an insulation property, wherein
the coil is wound around the bobbin,
the first, third, and fourth yokes holds the bobbin, and
at least one of the first, third, or fourth yokes is fixed to the frame.

15. The vibration generator according to claim 12, further comprising a bobbin having a tuboid shape and an insulation property, the bobbin including:
a trunk with the coil wound therearound, and
a first insulator between the first yoke and the coil, wherein the first shaft of the plunger is received in the coil and the trunk of the bobbin.

16. The vibration generator according to claim 15, further comprising a buffer held by and between the first yoke and the first insulator.

17. The vibration generator according to claim 1, further comprising:
a third yoke disposed on one side in the second direction relative to the coil and extending in the first direction; and
a fourth yoke disposed on the other side in the second direction relative to the coil and extending in the first direction.

18. The vibration generator according to claim 1, wherein the frame includes:
a first fixable portion fixed to the first shaft at a first position, the first position being at a first height position and on the one side in the first direction relative to the coil, and
a second fixable portion fixed to the second shaft at a second position, the second position being at a second height position and on the other side in the first direction relative to the coil,
the first height position and the second height position are different in height in a third direction, and
the third direction crosses the first direction and the second direction.

19. The vibration generator according to claim 1, wherein the frame includes:
a first fixable portion on the one side in the first direction relative to the coil, and
a second fixable portion on the other side in the first direction relative to the coil,
the vibration generator further comprises:
at least one pin or screw, and
at least one washer, wherein
the pin or screw includes a head and has at least one of configurations (1) and (2):
(1) the pin or screw is configured to fix the first fixable portion to the first shaft, or
(2) the pin or screw is configured to fix the second fixable portion to the second shaft, and
the washer has at least one of configurations (3) and (4):
(3) the washer is held by and between the head of the pin or screw and the first fixable portion, or (4) the washer is held by and between the head of the pin or screw and the second fixable portion, and the washer includes a tooth configured to dig into at least one of the first fixable portion and the second fixable portion.

20. An electronic device comprising:

the vibration generator according to claim 1;

a fixable portion to be fixed to the frame of the vibration generator; and a vibratable member connected to the frame of the vibration generator and configured to be vibrated as a result of repeated elastic deformation and restoration of the frame.

21. The electronic device according to claim 20, wherein the frame of the vibration generator includes:

a third fixable portion fixed to the fixable portion of the electronic device, and a pair of fourth fixable portions fixed to the vibratable member at positions on the one and other sides in the first direction relative to the third fixable portion.

* * * * *